(12) United States Patent
Atsushi et al.

(10) Patent No.: US 11,807,207 B2
(45) Date of Patent: Nov. 7, 2023

(54) HYDRAULIC PRESSURE CONTROL UNIT, BRAKING SYSTEM, AND BICYCLE

(71) Applicant: Robert Bosch GmbH, Stuttgart (DE)

(72) Inventors: Hiroaki Atsushi, Kanagawa (JP); Kazuki Chiba, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/968,638

(22) PCT Filed: Feb. 1, 2019

(86) PCT No.: PCT/IB2019/050805
§ 371 (c)(1),
(2) Date: Aug. 10, 2020

(87) PCT Pub. No.: WO2019/159029
PCT Pub. Date: Aug. 22, 2019

(65) Prior Publication Data
US 2020/0398802 A1    Dec. 24, 2020

(30) Foreign Application Priority Data
Feb. 14, 2018    (JP) ................. 2018-023637

(51) Int. Cl.
*B60T 8/36*    (2006.01)
*B60T 8/176*    (2006.01)
(Continued)

(52) U.S. Cl.
CPC ............ *B60T 8/176* (2013.01); *B60T 8/1706* (2013.01); *B60T 8/3225* (2013.01); *B62L 3/023* (2013.01); *B60T 2270/10* (2013.01)

(58) Field of Classification Search
CPC .... B60T 8/1706; B60T 8/3225; B60T 8/4233; B60T 8/4208; B60T 8/4266; B60T 8/3675; B60T 8/368; B60T 8/3685; B62L 3/023
See application file for complete search history.

(56) References Cited

U.S. PATENT DOCUMENTS 4,095,663 A * 6/1978 Gaffney ................... B62M 6/90
                                                180/205.1
5,988,772 A * 11/1999 Hashida ................ B60T 8/3675
                                                137/596.17
(Continued)

FOREIGN PATENT DOCUMENTS

DE       20204408       9/2002
DE     102005004465     9/2005
(Continued)

OTHER PUBLICATIONS

International Search Report for Application No. PCT/IB2019/050805 dated May 10, 2019 (English Translation, 3 pages).

*Primary Examiner* — Nicholas J Lane
*Assistant Examiner* — Stephen M Bowes
(74) *Attorney, Agent, or Firm* — Michael Best & Friedrich LLP

(57) ABSTRACT

A hydraulic pressure control unit disposed at a suitable place of a bicycle is provided. A braking system including such a hydraulic pressure control unit is also provided. A bicycle including such a braking system is also provided.
A hydraulic pressure control unit (110) of a braking system (100) mounted on a bicycle (200) and capable of executing an antilock braking control includes: an inlet valve (131) and an outlet valve (132) which are opened and closed when the antilock braking control is executed; and a base body (120) to which the inlet valve (131) and the outlet valve (132) are attached, wherein a mount part of the hydraulic pressure (Continued)

control unit (110) for mounting the hydraulic pressure control unit (110) to the bicycle (200) is joined to a front fork (15) of the bicycle (200).

14 Claims, 5 Drawing Sheets

(51) Int. Cl.
*B60T 8/17* (2006.01)
*B60T 8/32* (2006.01)
*B62L 3/02* (2006.01)

(56) References Cited

U.S. PATENT DOCUMENTS

| | | | | |
|---|---|---|---|---|
| 2007/0278853 A1* | 12/2007 | Bayer | ................ | B60T 8/3225 303/9.64 |
| 2009/0243377 A1* | 10/2009 | Kofuji | ................ | B60G 17/027 303/9.64 |
| 2015/0191161 A1* | 7/2015 | Sagayama | ............. | B62K 23/06 303/137 |
| 2015/0329094 A1 | 11/2015 | Weh et al. | | |
| 2017/0210364 A1* | 7/2017 | Sagayama | ............... | B60T 8/363 |

FOREIGN PATENT DOCUMENTS

| | | | | |
|---|---|---|---|---|
| DE | 102008019469 | | 10/2009 | |
| DE | 102013217254 | | 3/2014 | |
| JP | H04506787 A | | 11/1992 | |
| JP | H10142035 A | | 6/1998 | |
| JP | 2009234502 A | * | 10/2009 | |
| JP | 2009241701 A | | 10/2009 | |
| JP | 2010234826 A | | 10/2010 | |
| JP | 2013248940 A | | 12/2013 | |
| JP | 2014069663 A | | 4/2014 | |
| JP | 2014213790 A | * | 11/2014 | ........... B60T 8/3685 |
| JP | 2015074345 | | 4/2015 | |
| WO | 2017115171 | | 7/2017 | |

\* cited by examiner

HYDRAULIC PRESSURE CONTROL UNIT, BRAKING SYSTEM, AND BICYCLE

BACKGROUND OF THE INVENTION

The present invention relates to a hydraulic pressure control unit of a braking system capable of executing an antilock braking control, a braking system including the hydraulic pressure control unit, and a bicycle including the braking system.

There is a conventional bicycle which includes a braking system capable of executing an antilock braking control. The braking system includes a hydraulic pressure control unit for changing the hydraulic pressure of brake fluid in a wheel braking part. The hydraulic pressure control unit has a base body in which an internal flow path is formed, and an inlet valve and an outlet valve which are attached to the base body and opened and closed when the antilock braking control is executed (e.g., see WO 2017/115171).

In the conventional bicycle, a hydraulic pressure control unit is joined to a periphery of a handle, which has a comparatively large space. However, the periphery of the handle is a place where equipment such as an indicator that should be normally visually perceived by a user should be preferentially disposed. It is not preferable that equipment such as a hydraulic pressure control unit that is not necessarily required to be normally visually perceived by a user is disposed at such a place.

SUMMARY OF THE INVENTION

The present invention has been made in view of the above-described problem, and an object thereof is to provide a hydraulic pressure control unit disposed at a suitable place of a bicycle. Further, an object of the present invention is to provide a braking system including such a hydraulic pressure control unit. Further, an object of the present invention is to provide a bicycle including such a braking system.

The present invention is directed to a hydraulic pressure control unit of a braking system mounted on a bicycle and capable of executing an antilock braking control, the hydraulic pressure control unit including: an inlet valve and an outlet valve which are opened and closed when the antilock braking control is executed; and a base body to which the inlet valve and the outlet valve are attached, a mount part of the hydraulic pressure control unit for mounting the hydraulic pressure control unit to the bicycle being joined to a front fork of the bicycle.

The present invention is also directed to a braking system including the hydraulic pressure control unit defined above.

The present invention is also directed to a bicycle including the braking system defined above.

In the hydraulic pressure control unit, the braking system, and the bicycle according to the present invention, the mount part of the hydraulic pressure control unit to the bicycle is joined to the front fork of the bicycle. Therefore, when mounting the braking system capable of executing the antilock braking control on the bicycle, equipment that should be normally visually perceived by a user can be attached to a periphery of a handle without hindrance. Further, when it is necessary to connect many elements disposed near a front wheel of the bicycle to the hydraulic pressure control unit, this connection is facilitated since the hydraulic pressure control unit is disposed near the front wheel.

DETAILED DESCRIPTION

Figure 1:
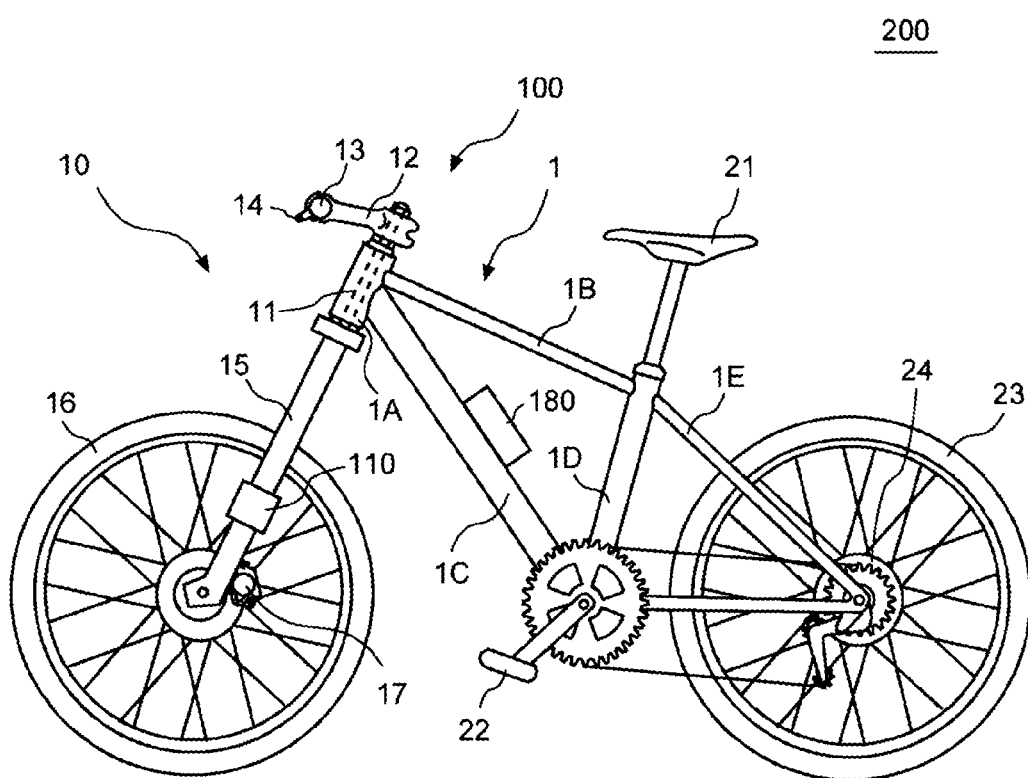
FIG. 1 is a view showing a schematic configuration of a bicycle on which a braking system according to an embodiment of the present invention is mounted.

Hereinafter, a hydraulic pressure control unit, a braking system, and a bicycle according to the present invention will be described with reference to the drawings.

Meanwhile, in the following, the case where a braking system according to the present invention is mounted on a normal bicycle is described. However, the braking system according to the present invention may be mounted on another bicycle such as an electric-assisted bicycle or an electric bicycle. Meanwhile, a bicycle means a general vehicle in which a propulsion force can be generated by a user providing a pedal effort to a pedal. Further, the normal bicycle means a bicycle in which a propulsion force is obtained by only a pedal effort provided by a user. Further, the electric-assisted bicycle means a bicycle which has a function of assisting a pedal effort provided by a user with an electric motor. Further, the electric bicycle means a bicycle which has a function of obtaining a propulsion force by only an electric motor.

Further, the configuration, operation, and the like described below are examples, and a hydraulic pressure control unit, a braking system, and a bicycle according to the present invention are not limited to the case of such configuration, operation, and the like. For example, in the following, the case where the hydraulic pressure control unit according to the present invention is a pump-less type is described. However, the hydraulic pressure control unit according to the present invention may have a pump to assist the flow of brake fluid. Further, in the following, the case where a braking system according to the present invention executes an antilock braking control for only a braking force generated in a front wheel is described. However, the braking system according to the present invention may execute an antilock braking control for only a braking force generated in a rear wheel or may execute an antilock braking control for both a braking force generated in a front wheel and a braking force generated in a rear wheel.

Further, in each of the drawings, the same or similar members or parts are denoted by the same reference numerals or the reference numerals thereof are omitted. Further, for the detailed structure, illustration is simplified or omitted as appropriate. Further, duplicated explanations are simplified or omitted as appropriate.

Embodiments

Hereinafter, a braking system according to an embodiment will be described.

<Mounting of Braking System onto Bicycle>

Mounting of a braking system according to an embodiment onto a bicycle will be described.

FIG. 1 is a view showing a schematic configuration of a bicycle on which a braking system according to an embodiment of the present invention is mounted. Meanwhile, although FIG. 1 shows a case where a bicycle 200 is a two-wheeled vehicle, the bicycle 200 may be another bicycle such as a three-wheeled vehicle.

As shown in FIG. 1, the bicycle 200 includes a frame 1, a turning part 10, a saddle 21, a pedal 22, a rear wheel 23, and a rear wheel braking part 24.

For example, the frame 1 has a head tube 1A pivotally supporting a steering column 11 of the turning part 10, a top tube 1B and a down tube 1C joined to the head tube 1A, a seat tube 1D joined to the top tube 1B and the down tube 1C and holding the saddle 21, and a stay 1E joined to upper and lower ends of the seat tube 1D and holding the rear wheel 23 and the rear wheel braking part 24.

The turning part 10 includes the steering column 11, a handle stem 12 held by the steering column 11, a handle bar 13 held by the handle stem 12, a braking operation part 14 attached to the handle bar 13, a front fork 15 joined to the steering column 11, a front wheel 16 rotatably held by the front fork 15, and a front wheel braking part 17. The front fork 15 is a member that has one end joined to the steering column 11 and the other end extending on both sides of the front wheel 16 and reaching the rotation center of the front wheel 16.

The braking operation part 14 includes a mechanism used as an operation part of the front wheel braking part 17 and a mechanism used as an operation part of the rear wheel braking part 24. For example, the mechanism used as an operation part of the front wheel braking part 17 is disposed on the right end side of the handle bar 13, and the mechanism used as an operation part of the rear wheel braking part 24 is disposed on the left end side of the handle bar 13.

A hydraulic pressure control unit 110 is joined to the front fork 15 of the turning part 10. The hydraulic pressure control unit 110 is a unit responsible for controlling the hydraulic pressure of brake fluid in the front wheel braking part 17. Meanwhile, the rear wheel braking part 24 may be a type of a braking part that generates a braking force by increasing the hydraulic pressure of brake fluid or may be a type of a braking part that mechanically generates a braking force (for example, a type of a braking part that generates a braking force by generating a tension on a wire, etc.).

For example, a power supply unit 180 serving as a power supply of the hydraulic pressure control unit 110 is attached to the down tube 1C of the frame 1. The power supply unit 180 may be a battery or a generator. For example, the generator includes those (for example, a hub dynamo that generates power by the rotation of the front wheel 16 or the rear wheel 23, one that serves as an electric motor of a driving source of the front wheel 16 or the rear wheel 23 and generates regenerative electric power, etc.) that generate power by the running of the bicycle 200, those that generate power with sunlight, and the like.

That is, the bicycle 200 is equipped with a braking system 100. The braking system 100 includes at least the braking operation part 14, the front wheel braking part 17, the hydraulic pressure control unit 110, and the power supply unit 180. The braking system 100 is capable of executing an antilock braking control by controlling the hydraulic pressure of brake fluid in the front wheel braking part 17 with the hydraulic pressure control unit 110.

<Configuration of Braking System>

A configuration of a braking system according to an embodiment will be described.

Figure 2:
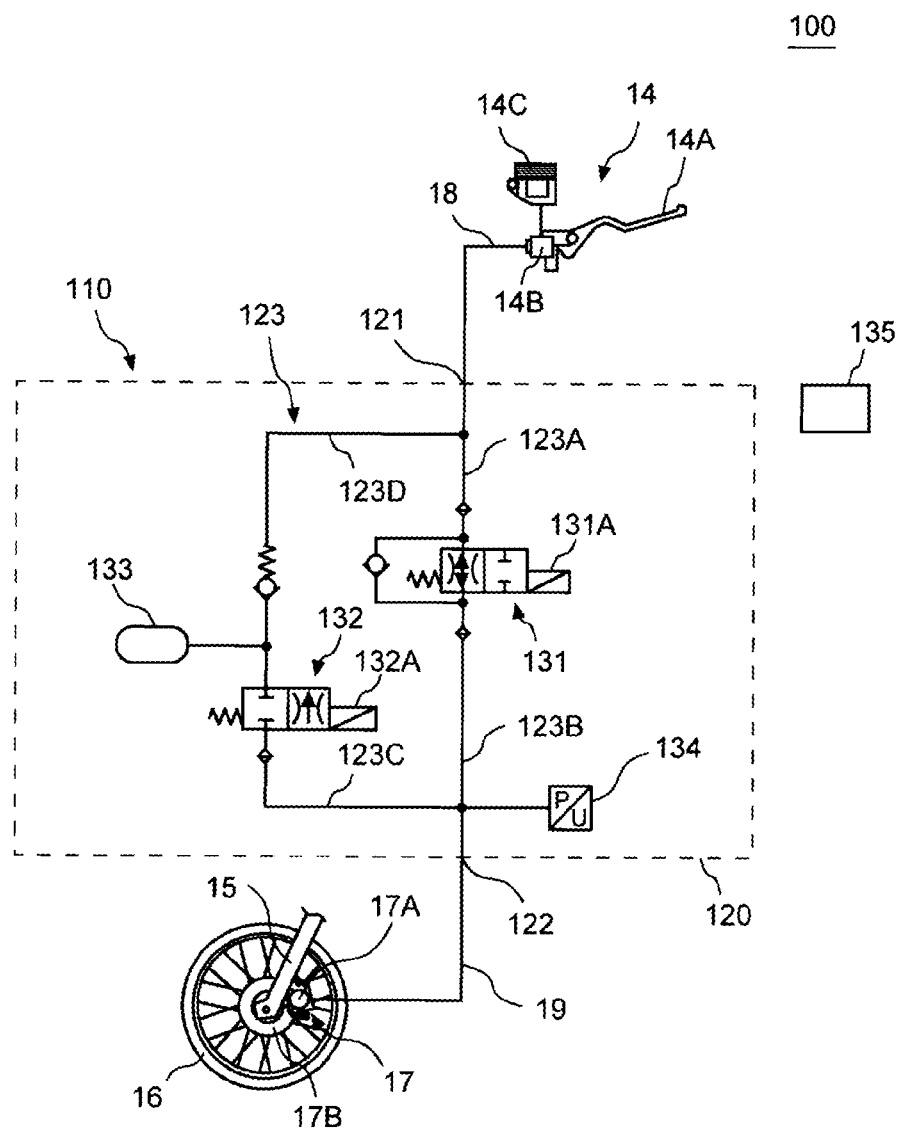
FIG. 2 is a view showing a schematic configuration of the braking system according to the embodiment of the present invention.

FIG. 2 is a view showing a schematic configuration of a braking system according to the embodiment of the present invention.

As shown in FIG. 2, the hydraulic pressure control unit 110 has a base body 120 which will be described later in detail. A master cylinder port 121, a wheel cylinder port 122, and an internal flow path 123 for communicating the master cylinder port 121 and the wheel cylinder port 122 with each other are formed in the base body 120.

The internal flow path 123 has a partial flow path 123A, a partial flow path 123B, a partial flow path 123C, and a partial flow path 123D. The master cylinder port 121 and the wheel cylinder port 122 communicate with each other via the partial flow path 123A and the partial flow path 123B. Further, the portion between an intermediate portion of the partial flow path 123B and an intermediate portion of the partial flow path 123A is bypassed via the partial flow path 123C and the partial flow path 123D.

The braking operation part 14 is connected to the master cylinder port 121 via a liquid pipe 18. The braking operation part 14 has a brake lever 14A, a master cylinder 14B, and a reservoir 14C. The master cylinder 14B has a piston part (not shown) which moves in conjunction with the operation of the brake lever 14A by a user. The master cylinder 14B is connected to an inlet side of the partial flow path 123A via the liquid pipe 18 and the master cylinder port 121. With the movement of the piston part, the hydraulic pressure of brake fluid in the partial flow path 123A increases or decreases. Further, the brake fluid for the master cylinder 14B is accumulated in the reservoir 14C.

The front wheel braking part 17 is connected to the wheel cylinder port 122 via a liquid pipe 19. The front wheel braking part 17 has a wheel cylinder 17A and a rotor 17B. The wheel cylinder 17A is attached to a lower end portion of the front fork 15 (that is, a portion far from the steering column 11 than the portion to which the hydraulic pressure control unit 110 is attached). The wheel cylinder 17A has a piston part (not shown) which moves in conjunction with the hydraulic pressure of the liquid pipe 19. The wheel cylinder 17A is connected to an outlet side of the partial flow path 123B via the liquid pipe 19 and the wheel cylinder port 122. The rotor 17B is held by the front wheel 16 and rotates together with the front wheel 16. With the movement of the piston part, a brake pad (not shown) is pressed against the rotor 17B, thereby braking the front wheel 16.

Further, the hydraulic pressure control unit 110 has an inlet valve 131 and an outlet valve 132. The inlet valve 131 is provided between an outlet side of the partial flow path 123A and an inlet side of the partial flow path 123B, and opens and closes the flow of brake fluid between the partial flow path 123A and the partial flow path 123B. The outlet valve 132 is provided between an outlet side of the partial flow path 123C and an inlet side of the partial flow path 123D, and opens and closes the flow of brake fluid between the partial flow path 123C and the partial flow path 123D. The hydraulic pressure of brake fluid is controlled by the opening and closing operations of the inlet valve 131 and the outlet valve 132.

The inlet valve 131 is, for example, an electromagnetic valve which is opened when de-energized. When a first coil 131A as a driving source is in a de-energized state, the inlet valve 131 releases the flow of brake fluid in both directions. Further, when the first coil 131A is energized, the inlet valve 131 is brought into a closed state to block the flow of brake fluid.

The outlet valve 132 is, for example, an electromagnetic valve which is closed when de-energized. When a second coil 132A as a driving source is in a de-energized state, the outlet valve 132 blocks the flow of brake fluid. Further, when the second coil 132A is energized, the outlet valve 132 is brought into an opened state to release the flow of brake fluid.

Further, the hydraulic pressure control unit 110 has an accumulator 133. The accumulator 133 is connected to an intermediate portion of the partial flow path 123D. The brake fluid that has passed through the outlet valve 132 is stored in the accumulator 133.

Further, the hydraulic pressure control unit 110 has a hydraulic pressure sensor 134 for detecting the hydraulic pressure of brake fluid in the wheel cylinder 17A. The hydraulic pressure sensor 134 is provided in the partial flow path 123B or the partial flow path 123C.

Further, the hydraulic pressure control unit 110 has a control unit 135. Signals from various sensors such as the hydraulic pressure sensor 134 and a wheel speed sensor (not shown) for detecting the rotational speed of the front wheel 16 are inputted to the control unit 135. Meanwhile, the respective parts of the control unit 135 may be arranged in a bundled manner or may be arranged in a distributed manner. For example, the control unit 135 may be configured to include a microcomputer, a microprocessor unit and the like, or may be configured to include an updatable firmware or the like, or may be configured to include a program module or the like which is executed by a command from a CPU or the like.

The control unit 135 controls the hydraulic pressure of brake fluid in the wheel cylinder 17A, i.e., the braking force of the front wheel 16 by controlling the opening and closing operations of the inlet valve 131 and the outlet valve 132.

For example, when a user brakes the front wheel 16 by operating the brake lever 14A, the control unit 135 starts an antilock braking control when it is determined from a signal of a wheel speed sensor (not shown) that the front wheel 16 is locked or may be locked.

When the antilock braking control is started, the control unit 135 brings the first coil 131A into an energized state to close the inlet valve 131 and blocks the flow of brake fluid from the master cylinder 14B to the wheel cylinder 17A, thereby suppressing the pressure increase of brake fluid in the wheel cylinder 17A. On the other hand, the control unit 135 brings the second coil 132A into an energized state to open the outlet valve 132 and allows the flow of brake fluid from the wheel cylinder 17A to the accumulator 133, thereby decreasing the pressure of brake fluid in the wheel cylinder 17A. In this way, the locking of the front wheel 16 is released or avoided. When it is determined from a signal of the hydraulic pressure sensor 134 that the pressure of brake fluid in the wheel cylinder 17A decreases to a predetermined value, the control unit 135 brings the second coil 132A into a de-energized state to close the outlet valve 132 and, for a short time, brings the first coil 131A into a de-energized state to open the inlet valve 131, thereby increasing the pressure of brake fluid in the wheel cylinder 17A. The control unit 135 may increase or decrease the pressure of the wheel cylinder 17A only once or may repeat the same multiple times.

When the antilock braking control is ended and the brake lever 14A is returned, the inside of the master cylinder 14B is brought into an atmospheric pressure state and the brake fluid in the wheel cylinder 17A is returned. Further, due to the occurrence of such atmospheric pressure state, the brake fluid in the accumulator 133 is returned to the partial flow path 123A.

<Configuration of Hydraulic Pressure Control Unit>

A configuration of a hydraulic pressure control unit of the braking system according to the embodiment will be described.

Figure 3:
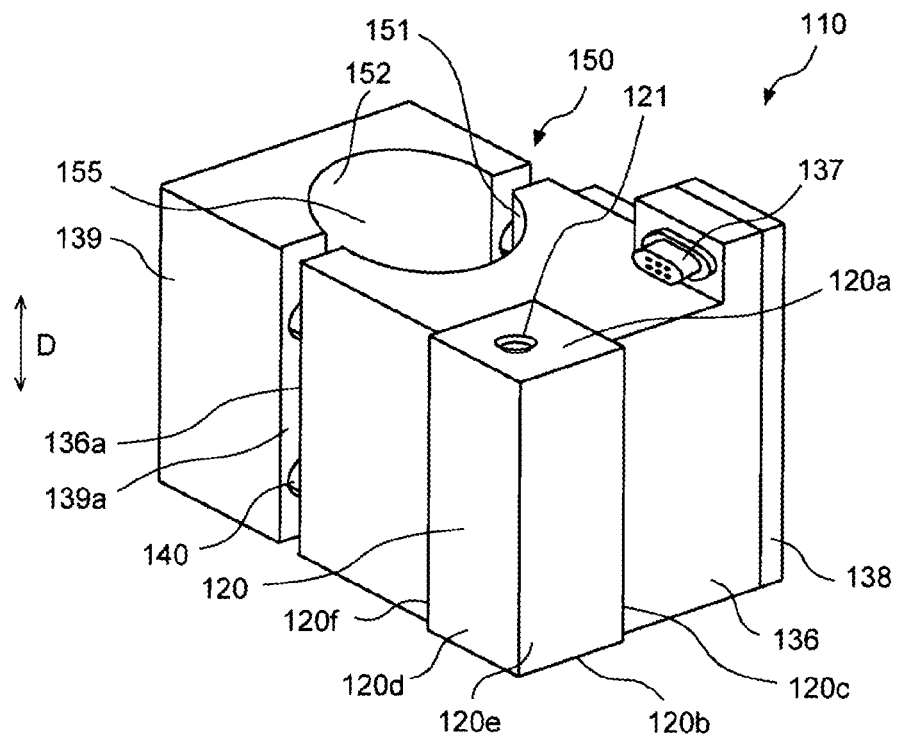
FIG. 3 is a perspective view of a hydraulic pressure control unit of the braking system according to the embodiment of the present invention.
Figure 4:
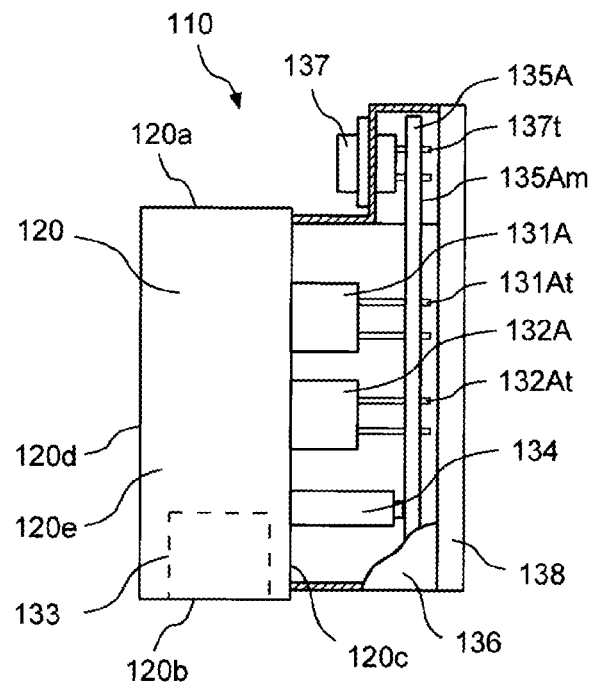
FIG. 4 is a front view of the hydraulic pressure control unit of the braking system according to the embodiment of the present invention in a state where a fifth surface of a base body is viewed from the front.
Figure 5:
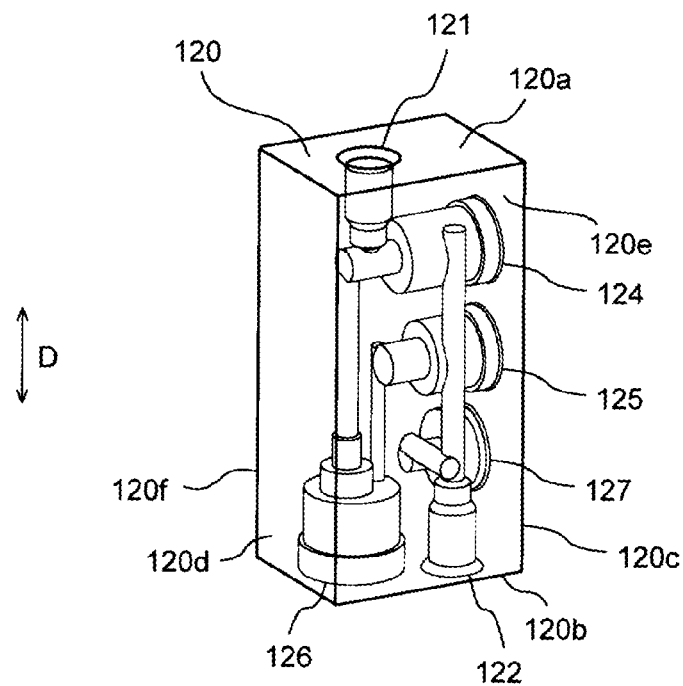
FIG. 5 is a perspective view of the base body of the hydraulic pressure control unit of the braking system according to the embodiment of the present invention.
Figure 6:
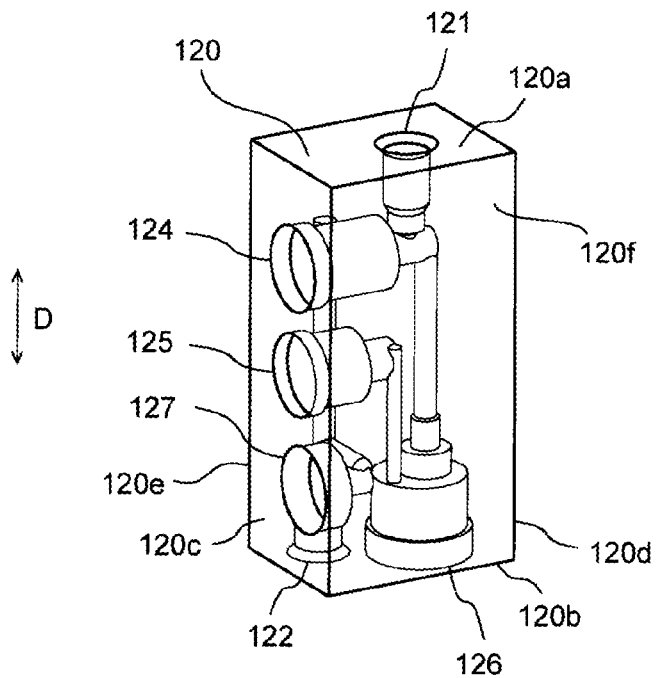
FIG. 6 is a perspective view of the base body of the hydraulic pressure control unit of the braking system according to the embodiment of the present invention.

FIG. 3 is a perspective view of a hydraulic pressure control unit of the braking system according to the embodiment of the present invention. FIG. 4 is a front view of the hydraulic pressure control unit of the braking system according to the embodiment of the present invention in a state where a fifth surface of a base body is viewed from the front. FIGS. 5 and 6 are perspective views of the base body of the hydraulic pressure control unit of the braking system according to the embodiment of the present invention. Meanwhile, FIG. 4 shows a state in which an outer surface of only coil casing 136 is partially broken. Further, in FIGS. 5 and 6, an internal structure of the base body 120 is drawn so as to overlap with the outer shape of the hydraulic pressure control unit 110.

As shown in FIGS. 3 and 4, the hydraulic pressure control unit 110 includes the base body 120, the coil casing 136, a connector 137, and a casing cover 138.

The base body 120 is a substantially rectangular parallelepiped member made of, for example, an aluminum alloy. The base body 120 has a first surface 120a serving as an upper surface in a state where the bicycle 200 stands upright, a second surface 120b facing the first surface 120a and serving as a lower surface in a state where the bicycle 200 stands upright, a third surface 120c having both ends reaching the first surface 120a and the second surface 120b and serving as one side surface in a state where the bicycle 200 standing upright is viewed from the front, a fourth surface 120d facing the third surface 120c and serving as the other side surface in a state where the bicycle 200 standing upright is viewed from the front, a fifth surface 120e having both ends reaching the first surface 120a and the second surface 120b and serving as a back surface in a state where the bicycle 200 standing upright is viewed from the front, and a sixth surface 120f facing the fifth surface 120e and serving as a front surface in a state where the bicycle 200 standing upright is viewed from the front. Meanwhile, each surface may be flat, or may have a curved portion, or may have a step.

The master cylinder port 121 is formed in the first surface 120a of the base body 120 and the wheel cylinder port 122 is formed in the second surface 120b of the base body 120 (see FIGS. 5 and 6). That is, the master cylinder port 121 and the wheel cylinder port 122 are formed on separate surfaces of the base body 120 facing each other.

An inlet valve hole 124 to which the inlet valve 131 is attached and an outlet valve hole 125 to which the outlet valve 132 is attached are formed in the third surface 120c of the base body 120 (see FIGS. 5 and 6). Valve bodies (not shown) of the inlet valve 131 and the outlet valve 132 are located in the internal flow path 123 of the base body 120. Further, the first coil 131A serving as a driving source of the inlet valve 131 and the second coil 132A serving as a driving source of the outlet valve 132 are attached in a state where their axial directions face the valve bodies (not shown). The first coil 131A and the second coil 132A are held in a state where one ends thereof are in contact with the base body 120 and the other ends protrude from the third surface 120c of the base body 120. That is, the first coil 131A and the second coil 132A are erected on the third surface 120c. A connecting terminal (plus terminal and minus terminal) 131At is erected on an end portion of the first coil 131A on the side protruding from the third surface 120c. A connecting terminal (plus terminal and minus terminal) 132At is erected on an end portion of the second coil 132A on the side protruding from the third surface 120c. The connecting terminal 131At and the connecting terminal 132At are inserted into throughholes formed in a circuit board 135A constituting at least a part of the control unit 135 and are electrically connected to the circuit board 135A.

Further, an accumulator hole 126 is formed in the second surface 120b of the base body 120 (see FIGS. 5 and 6). A bottom portion of the accumulator hole 126 communicates with the internal flow path 123 of the base body 120. Respective members (for example, a plunger, a compression spring, a hole cover, etc.) constituting the accumulator 133 are attached to the inside of the accumulator hole 126 to constitute the accumulator 133. That is, the accumulator 133 is provided on the second surface 120b.

Further, a hydraulic pressure sensor hole 127 is formed in the third surface 120c of the base body 120 (see FIGS. 5 and 6). The hydraulic pressure sensor 134 is attached to the hydraulic pressure sensor hole 127. In this state, one end of the hydraulic pressure sensor 134 is located in the internal flow path 123 of the base body 120. Further, the other end of the hydraulic pressure sensor 134 is electrically connected to the circuit board 135A.

The coil casing 136 is made of, for example, resin. The coil casing 136 has a shape covering the third surface 120c and the sixth surface 120f of the base body 120. The coil casing 136 has an internal space which penetrates the portion of the coil casing 136 covering at least the third surface 120c of the base body 120. In a state where the coil casing 136 is attached to the base body 120, the first coil 131A, the second coil 132A, the hydraulic pressure sensor 134, and the circuit board 135A are accommodated in the internal space.

In a state where the bicycle 200 stands upright, upper ends of the coil casing 136 and the circuit board 135A extend above the first surface 120a of the base body 120. The connector 137 is attached to the upper end of the coil casing 136. A connecting terminal 137t of the connector 137 is inserted into a through-hole formed in the circuit board 135A and is electrically connected to the circuit board 135A. A cable group including signal lines (not shown) of various sensors such as the hydraulic pressure sensor 134 and a wheel speed sensor (not shown) for detecting the rotational speed of the front wheel 16 and a power supply line (not shown) extending from the power supply unit 180, and the like is connected to the connector 137.

The casing cover 138 is attached to the surface of the coil casing 136 facing the surface in contact with the third surface 120c of the base body 120. In a state where the casing cover 138 is attached to the coil casing 136, the internal space of the coil casing 136 is hermetically sealed.

A fixing member 139 for connecting the hydraulic pressure control unit 110 to the front fork 15 of the bicycle 200 is joined to the coil casing 136 by using a fastener 140. For example, in a state where the bicycle 200 standing upright is viewed from the front, a recess extending substantially in an upper and lower direction is formed on a front surface 136a of the coil casing 136. Further, in a state where the bicycle 200 standing upright is viewed from the front, a recess extending substantially in the upper and lower direction is formed on a back surface 139a of the fixing member 139. Further, a columnar space 155 with both ends opened is formed between an inner surface of the recess that is a partial region 151 of an outer surface of the coil casing 136 and an inner surface of the recess that is a partial region 152 of an outer surface of the fixing member 139, so that a mount part 150 of the hydraulic pressure control unit 110 to the bicycle 200 is formed. Meanwhile, although FIG. 3 shows a case where the fixing member 139 has a block shape, the fixing member 139 may be one or more bands or the like. That is, the entire of the outer circumference of the columnar space 155 may not be closed. Further, although FIG. 3 shows a case where the recesses are formed in both the front surface 136a of the coil casing 136 and the back surface 139a of the fixing member 139, one or both of the front surface 136a of the coil casing 136 and the back surface 139a of the fixing member 139 may be flat. That is, the columnar space 155 may not have a columnar shape.

Here, a direction in which the first surface 120a and the second surface 120b of the base body 120 are arranged or a direction in which the columnar space 155 extends is defined as a direction D, and the positional relationship of respective members will be described. Meanwhile, the direction in which the first surface 120a and the second surface 120b of the base body 120 are arranged is defined as a direction parallel to a straight line intersecting with the first surface 120a and the second surface 120b. Further, the direction in which the columnar space 155 extends is defined as a direction parallel to a straight line intersecting with both end surfaces of the columnar space 155.

First, the first coil 131A, the second coil 132A, and the hydraulic pressure sensor 134 are arranged side by side along the direction D. That is, the straight line parallel to the direction D intersects with the first coil 131A, the second coil 132A, and the hydraulic pressure sensor 134. In the direction D, the first coil 131A, i.e., the inlet valve 131 is located closer to the master cylinder port 121 than the second coil 132A, i.e., the outlet valve 132. Further, the hydraulic pressure sensor 134 is located closer to the wheel cylinder port 122 than the first coil 131A, i.e., the inlet valve 131 and the second coil 132A, i.e., the outlet valve 132.

Further, the circuit board 135A is held in a state where its mounting surface 135Am extends along the direction D. That is, in a state where the bicycle 200 stands upright, the circuit board 135A is held in an upright state. In particular, in a state where the bicycle 200 stands upright, it is preferable that the circuit board 135A is held in a state where the mounting surface 135Am extends along the direction D and extends along a front and rear direction of the bicycle 200.

Further, the connector 137 is erected in a direction different from the direction D. That is, the connector 137 is held in a state where the attachment and detachment direction of the cable group connected to the connector 137 is different from the direction D. In particular, in a state where the bicycle 200 standing upright is viewed from the front, it is preferable that the attachment and detachment direction is a substantially right and left direction. Further, it is preferable that the first coil 131A, the second coil 132A, and the connector 137 are held in a state where leading ends of the connecting terminal 131At, the connecting terminal 132At, and the connecting terminal 137t protrude from the same side with respect to the mounting surface 135Am of the circuit board 135A. Furthermore, in a state where the mounting surface 135Am of the circuit board 135A is viewed from the front, it is preferable that the connector 137 is located on the side where the first surface 120a is located with respect to the first coil 131A and the second coil 132A.

<Connection of Hydraulic Pressure Control Unit to Bicycle>

Figure 7:
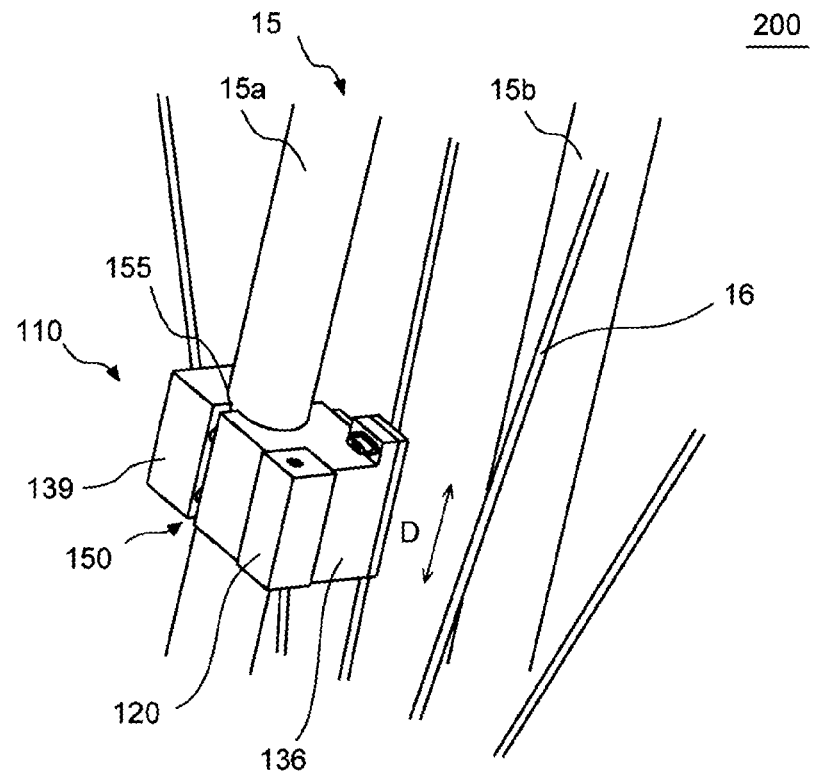
FIG. 7 is a perspective view showing a connection state of the hydraulic pressure control unit of the braking system according to the embodiment of the present invention to the bicycle.

Connection of the hydraulic pressure control unit of the braking system according to the embodiment to a bicycle will be described. FIG. 7 is a perspective view showing a connection state of the hydraulic pressure control unit of the braking system according to the embodiment of the present invention to a bicycle.

As shown in FIG. 7, the hydraulic pressure control unit 110 is held in a state where the front fork 15 of the bicycle 200 is located in the columnar space 155 of the mount part 150. That is, the fixing member 139 is joined to the coil casing 136 with the front fork 15 sandwiched therebetween to form the mount part 150. In this way, the hydraulic pressure control unit 110 is joined to the bicycle 200. Meanwhile, in a state where the bicycle 200 standing upright is viewed from the front, the hydraulic pressure control unit 110 may be joined to a first bar 15a extending on the right side of the front wheel 16 of the front fork 15 or may be joined to a second bar 15b extending on the left side of the front wheel 16 of the front fork 15. Further, the mount part 150 may be directly joined to the front fork 15 or may be joined to the front fork 15 via an adapter or the like.

In a state where the bicycle 200 standing upright is viewed from the front, the base body 120 and the coil casing 136 may be located on the back side of the front fork 15. In particular, it is preferable that the hydraulic pressure control unit 110 is attached in a state where the first coil 131A, the second coil 132A, the hydraulic pressure sensor 134, and the circuit board 135A are located between the base body 120 and the front wheel 16. That is, in a state where the bicycle 200 standing upright is viewed from the front, it is preferable that the hydraulic pressure control unit 110 is configured so that the first coil 131A, the second coil 132A, and the hydraulic pressure sensor 134 are erected on the third surface 120c that is a left surface of the base body 120 when the hydraulic pressure control unit 110 is attached to the first bar 15a. Furthermore, it is preferable that the connector 137 is erected to the left. Further, in a state where the bicycle 200 standing upright is viewed from the front, it is preferable that the hydraulic pressure control unit 110 is configured so that the first coil 131A, the second coil 132A, and the hydraulic pressure sensor 134 are erected on the third surface 120c that is a right surface of the base body 120 when the hydraulic pressure control unit 110 is attached to the second bar 15b. Furthermore, it is preferable that the connector 137 is erected to the right.

<Modification>

A modification of the hydraulic pressure control unit of the braking system according to the embodiment will be described.

Figure 8:
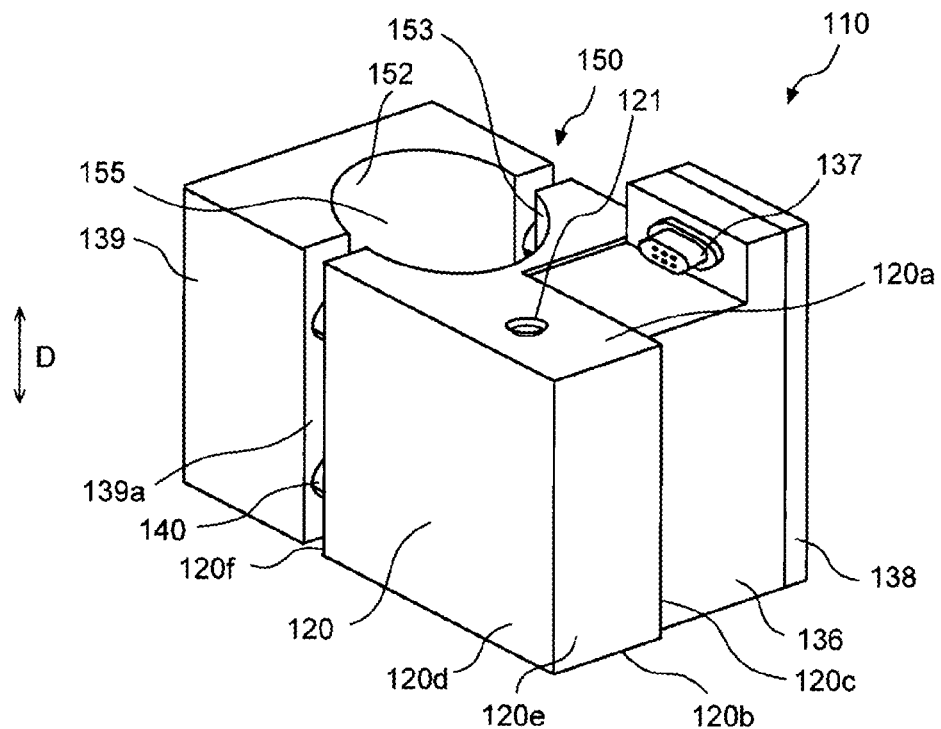
FIG. 8 is a perspective view showing a modification of the hydraulic pressure control unit of the braking system according to the embodiment of the present invention.

FIG. 8 is a perspective view showing a modification of the hydraulic pressure control unit of the braking system according to the embodiment of the present invention.

In the foregoing, the case where the fixing member 139 for joining the hydraulic pressure control unit 110 to the front fork 15 of the bicycle 200 is joined to the coil casing 136 has been described. However, as shown in FIG. 8, the fixing member 139 may be joined to the base body 120. For example, in a state where the bicycle 200 standing upright is viewed from the front, a recess extending substantially in the upper and lower direction is formed on the sixth surface 120f that is a front surface of the base body 120. Further, in a state where the bicycle 200 standing upright is viewed from the front, a recess extending substantially in the upper and lower direction is formed on the back surface 139a of the fixing member 139. Further, the columnar space 155 with both ends opened is formed between an inner surface of the recess that is a partial region 153 of an outer surface of the base body 120 and an inner surface of the recess that is the partial region 152 of the outer surface of the fixing member 139, so that the mount part 150 of the hydraulic pressure control unit 110 to the bicycle 200 is formed.

<Effect of Braking System>

Effects of the braking system according to the embodiment will be described.

In the braking system 100, the mount part 150 of the hydraulic pressure control unit 110 to the bicycle 200 is joined to the front fork 15 of the bicycle 200. Therefore, when mounting the braking system 100 capable of executing the antilock braking control on the bicycle 200, equipment that should be normally visually perceived by a user can be attached to a periphery of a handle without hindrance. Further, when it is necessary to connect many elements disposed near the front wheel 16 of the bicycle 200 to the hydraulic pressure control unit 110, this connection is facilitated since the hydraulic pressure control unit 110 is disposed near the front wheel 16.

Preferably, in the braking system 100, in a state where the bicycle 200 standing upright is viewed from the front, the base body 120 is located behind the front fork 15. With such a configuration, the damage to the base body 120 and members attached thereto by flying objects is suppressed.

Preferably, in the braking system 100, in a state where the bicycle 200 stands upright, the master cylinder port 121 is formed in the first surface 120a that is an upper surface of the base body 120, and the wheel cylinder port 122 is formed in the second surface 120b facing the first surface 120a of the base body 120. With such a configuration, the liquid pipe 18 communicating with the master cylinder 14B and the liquid pipe 19 communicating with the wheel cylinder 17A can be compactly arranged and the workability thereof is improved.

Preferably, in the braking system 100, the first coil 131A and the second coil 132A are erected on the third surface 120c of the base body 120, whose both ends reach the first surface 120a and the second surface 120b. With such a configuration, the first surface 120a and the second surface 120b are widened, so that a space for connecting the liquid pipe 18 to the master cylinder port 121 and connecting the liquid pipe 19 to the wheel cylinder port 122 can be secured while suppressing an increase in the protruding amount of the hydraulic pressure control unit 110 from the front fork 15. In particular, when the first coil 131A and the second coil 132A are arranged side by side along the direction D in which the first surface 120a and the second surface 120b are arranged, an increase in the protruding amount of the hydraulic pressure control unit 110 from the front fork 15 is further suppressed.

Preferably, in the braking system 100, the circuit board 135A is held in a state where its mounting surface 135Am extends along the direction D in which the first surface 120a and the second surface 120b are arranged. With such a configuration, it is possible to suppress an increase in the protruding amount of the hydraulic pressure control unit 110 from the front fork 15. In particular, when the circuit board 135A is held between the base body 120 and the front wheel 16, the protruding amount of the hydraulic pressure control unit 110 from the front fork 15 is further reduced.

Preferably, in the braking system 100, the connector 137 is erected in a direction different from the direction D in which the first surface 120a and the second surface 120b are arranged. With such a configuration, in a state where the bicycle 200 stands upright, one of a cable reaching the connector 137 from above (for example, a cable extending from the power supply unit 180) and a cable reaching the connector 137 from below (for example, cables extending from the hydraulic pressure sensor 134 and a wheel speed sensor) is prevented from largely protruding from the front fork 15. In particular, when the first coil 131A, the second coil 132A, and the connector 137 are held in a state where leading ends of the connecting terminals 131At, 132At, 137t protrude from the same side with respect to the mounting surface 135Am of the circuit board 135A, the process of connecting the first coil 131A, the second coil 132A, and the connector 137 to the circuit board 135A can be shortened.

Preferably, in the braking system 100, the accumulator 133 is provided on the second surface 120b of the base body 120. With such a configuration, it is possible to improve the air bent performance at the time of assembling the braking system 100. In particular, in a state where the mounting surface 135Am of the circuit board 135A is viewed from the front, when the connector 137 is located on the side where the first surface 120a is located with respect to the first coil 131A and the second coil 132A, the sizes of the first surface 120a and the second surface 120b are balanced, and the hydraulic pressure control unit 110 is made compact.

Preferably, in the braking system 100, the hydraulic pressure control unit 110 is a pump-less type. With such a configuration, the heavy hydraulic pressure control unit 110 is joined to the front fork 15, which less affects the travelling performance.

Although the embodiments have been described above, the present invention is not limited to the description of the embodiments. For example, only a part of the description of the embodiments may be implemented.

REFERENCE SIGNS LIST

1: Frame, 10: Turning part, 14: Braking operation part, 14A: Brake lever, 14B: Master cylinder, 14C: Reservoir, 15: Front fork, 16: Front wheel, 17: Front wheel braking part, 17A: Wheel cylinder, 17B: Rotor, 18, 19: Liquid pipe, 23: Rear wheel, 24: Rear wheel braking part, 100: Braking system, 110: Hydraulic pressure control unit, 120: Base body, 120a: First surface, 120b: Second surface, 120c: Third surface, 120d: Fourth surface, 120e: Fifth surface, 120f: Sixth surface, 121: Master cylinder port, 122: Wheel cylinder port, 123: Internal flow path, 124: Inlet valve hole, 125: Outlet valve hole, 126: Accumulator hole, 127: Hydraulic Pressure sensor hole, 131: Inlet valve, 131A: First coil, 131At: Connecting terminal, 132: Outlet valve, 132A: Second coil, 132At: Connecting terminal, 133: Accumulator, 134: Hydraulic pressure sensor, 135: Control unit, 135A: Circuit board, 135Am: Mounting surface, 136: Coil casing, 137: Connector, 137t: Connecting terminal, 138: Casing cover, 139: Fixing member, 140: Fastener, 150: Mount part, 151, 152, 153: Partial region, 155: Columnar space, 180: Power supply unit, 200: Bicycle.

What is claimed is:

1. A hydraulic pressure control unit (110) for use with a braking system (100) configured to be mounted on a bicycle (200), the hydraulic pressure control unit (110) capable of executing an antilock braking control, the hydraulic pressure control unit comprising:
   an inlet valve (131) and an outlet valve (132) which are opened and closed when the antilock braking control is executed; and
   a base body (120) to which the inlet valve (131) and the outlet valve (132) are attached,
   wherein a mount part (150) of the hydraulic pressure control unit (110) for mounting the hydraulic pressure control unit (110) to the bicycle (200) is configured to be joined to a front fork (15) of the bicycle (200),
   wherein a master cylinder port (121) to which a liquid pipe (18) communicating with a master cylinder (14B) is connected, a wheel cylinder port (122) to which a liquid pipe (19) communicating with a wheel cylinder (17A) is connected, and an internal flow path (123) communicating the master cylinder port (121) and the wheel cylinder port (122) with each other is formed in the base body (120),
   wherein, in a state where the hydraulic pressure control unit (110) is mounted on the bicycle (200) and the bicycle (200) stands upright, the master cylinder port (121) is formed in a first surface (120a) that is an upper surface of the base body (120), and the wheel cylinder port (122) is formed in a second surface (120b) facing the first surface (120a) of the base body (120),
   wherein the inlet valve (131) is driven by a first coil (131A),
   wherein the outlet valve (132) is driven by a second coil (132A),
   wherein the first coil (131A) and the second coil (132A) are erected on a third surface (120c) of the base body (120),
   wherein the third surface (120c) is generally planar and extends from the first surface (120a) to the second surface (120b),
   wherein the hydraulic pressure control unit (110) further comprises an accumulator (133) for storing brake fluid flowing through the internal flow path (123), and
   wherein the accumulator (133) is provided on the second surface (120b) of the base body (120).

2. The hydraulic pressure control unit according to claim 1, wherein
   in the state where the hydraulic pressure control unit (110) is mounted on the bicycle (200) and the bicycle (200) is standing upright is viewed from the front, the base body (120) is located behind the front fork (15).

3. The hydraulic pressure control unit according to claim 1, wherein
   the first coil (131A) and the second coil (132A) are arranged side by side along a direction (D) in which the first surface (120a) and the second surface (120b) are arranged.

4. The hydraulic pressure control unit according to claim 1, wherein the hydraulic pressure control unit is pump-less.

5. The hydraulic pressure control unit according to claim 1, further comprising a circuit board (135A) electrically connected to at least one of the first coil (131A) and the second coil (132A), wherein
   the circuit board (135A) is held in the state where a mounting surface (135Am) of the circuit board (135A) extends along the direction (D) in which the first surface (120a) and the second surface (120b) are arranged.

6. The hydraulic pressure control unit according to claim 5, wherein, in the state where the hydraulic pressure control unit (110) is mounted on the bicycle (200),
the circuit board (135A) is held between the base body (120) and a front wheel (16) of the bicycle (200).

7. The hydraulic pressure control unit according to claim 5, further comprising a connector (137) electrically connected to the circuit board (135A), wherein
the connector (137) is erected in a direction different from the direction (D) in which the first surface (120a) and the second surface (120b) are arranged.

8. The hydraulic pressure control unit according to claim 7, wherein
the first coil (131A), the second coil (132A), and the connector (137) are held in a state where leading ends of connecting terminals (131At, 132At, 137t) to the circuit board (135A) protrude from the same side with respect to the mounting surface (135Am) of the circuit board (135A).

9. A braking system (100), the braking system (100) comprising the hydraulic pressure control unit (110) according to claim 1.

10. A bicycle (200), the bicycle (200) comprising the braking system (100) according to claim 9.

11. The bicycle according to claim 10, wherein the front fork includes a first bar and a second bar that extend on opposite sides of a front wheel of the bicycle, and wherein the mount part (150) is positioned on the first bar between upper and lower ends of the first bar.

12. The bicycle according to claim 11, wherein, in a state where the bicycle stands upright, the mount part is positioned on the first bar closer to the lower end than the upper end.

13. A hydraulic pressure control unit (110) for use with a braking system (100) configured to be mounted on a bicycle (200), the hydraulic pressure control unit (110) capable of executing an antilock braking control, the hydraulic pressure control unit comprising:
an inlet valve (131) and an outlet valve (132) which are opened and closed when the antilock braking control is executed; and
a base body (120) to which the inlet valve (131) and the outlet valve (132) are attached,
wherein a mount part (150) of the hydraulic pressure control unit (110) for mounting the hydraulic pressure control unit (110) to the bicycle (200) is configured to be joined to a front fork (15) of the bicycle (200),
wherein a master cylinder port (121) to which a liquid pipe (18) communicating with a master cylinder (14B) is connected, a wheel cylinder port (122) to which a liquid pipe (19) communicating with a wheel cylinder (17A) is connected, and an internal flow path (123) communicating the master cylinder port (121) and the wheel cylinder port (122) with each other is formed in the base body (120),
wherein, in a state where the hydraulic pressure control unit (110) is mounted on the bicycle (200) and the bicycle (200) stands upright, the master cylinder port (121) is formed in a first surface (120a) that is an upper surface of the base body (120), and the wheel cylinder port (122) is formed in a second surface (120b) facing the first surface (120a) of the base body (120),
wherein the inlet valve (131) is driven by a first coil (131A),
wherein the outlet valve (132) is driven by a second coil (132A),
wherein the first coil (131A) and the second coil (132A) are erected on a third surface (120c) of the base body (120),
wherein the third surface (120c) is generally planar and extends from the first surface (120a) to the second surface (120b),
wherein the hydraulic pressure control unit (110) further comprises a circuit board (135A) electrically connected to at least one of the first coil (131A) and the second coil (132A), wherein the circuit board (135A) is held in a state where a mounting surface (135Am) of the circuit board (135A) extends along the direction (D) in which the first surface (120a) and the second surface (120b) are arranged,
wherein the hydraulic pressure control unit (110) further comprises a connector (137) electrically connected to the circuit board (135A), wherein the connector (137) is erected in a direction different from the direction (D) in which the first surface (120a) and the second surface (120b) are arranged, and
wherein the hydraulic pressure control unit (110) further comprises an accumulator (133) for storing brake fluid flowing through the internal flow path (123), wherein the accumulator (133) is provided on the second surface (120b) of the base body (120), and in a state where the mounting surface (135Am) of the circuit board (135A) is viewed from the front, the connector (137) is located on the side where the first surface (120a) is located with respect to the first coil (131A) and the second coil (132A).

14. A bicycle comprising a braking system (100) including a hydraulic pressure control unit (110) of the braking system (100), the hydraulic pressure control unit (110) being mounted on the bicycle (200) and being capable of executing an antilock braking control, the hydraulic pressure control unit comprising:
an inlet valve (131) and an outlet valve (132) which are opened and closed when the antilock braking control is executed; and
a base body (120) to which the inlet valve (131) and the outlet valve (132) are attached,
wherein a mount part (150) of the hydraulic pressure control unit (110) for mounting the hydraulic pressure control unit (110) to the bicycle (200) is joined to a front fork (15) of the bicycle (200),
wherein the front fork includes a first bar and a second bar that extend on opposite sides of a front wheel of the bicycle, and wherein the mount part (150) is positioned on the first bar between upper and lower ends of the first bar,
wherein, in a state where the bicycle stands upright, the mount part is positioned on the first bar closer to the lower end than the upper end
wherein a master cylinder port (121) to which a liquid pipe (18) communicating with a master cylinder (14B) is connected, a wheel cylinder port (122) to which a liquid pipe (19) communicating with a wheel cylinder (17A) is connected, and an internal flow path (123) communicating the master cylinder port (121) and the wheel cylinder port (122) with each other are formed in the base body (120),
wherein, in the state where the bicycle (200) stands upright, the master cylinder port (121) is formed in a first surface (120a) that is an upper surface of the base body (120), and the wheel cylinder port (122) is formed in a second surface (120b) facing the first surface (120a) of the base body (120), wherein the inlet valve (131) is driven by a first coil (131A),
wherein the outlet valve (132) is driven by a second coil (132A), and
wherein the first coil (131A) and the second coil (132A) are erected on a third surface (120c) of the base body (120).

* * * * *